United States Patent [19]

Coker

[11] 3,997,489

[45] Dec. 14, 1976

[54] MELT EXTRUDABLE POLYVINYL ALCOHOL COMPOSITIONS

[75] Inventor: James Newton Coker, Wilmington, Del.

[73] Assignee: E. I. Du Pont de Nemours and Company, Wilmington, Del.

[22] Filed: Nov. 25, 1974

[21] Appl. No.: 527,063

[52] U.S. Cl. .................. 260/28.5 R; 260/23 AR; 260/23.5 R; 260/23.5 A; 260/28.5 AV; 260/32.4; 260/32.6 R; 260/33.6 UA; 260/33.4 R; 260/897 R; 260/897 B

[51] Int. Cl.² ..................................... C08L 91/00

[58] Field of Search .......... 260/23.5 A, 28.5 AV, 260/28.5 R, 23 AR, 23.5 R, 33.4 R, 33.6 UA, 32.6 R, 32.4, 897 B, 897 R

[56] References Cited

UNITED STATES PATENTS

| | | | |
|---|---|---|---|
| 3,525,636 | 8/1970 | Bogart | 260/28.5 R |
| 3,607,812 | 9/1971 | Takigawa et al. | 260/29.6 B |

Primary Examiner—Melvyn I. Marquis

[57] ABSTRACT

Polyvinyl alcohol compositions of improved melt flow characteristics are obtained by the use of extrusion aids comprising a combination of a low molecular weight hydrocarbon oil or wax and a higher molecular weight ethylene homo- or copolymer. The improvement is even more pronounced in the presence of a plasticizer.

10 Claims, No Drawings

MELT EXTRUDABLE POLYVINYL ALCOHOL COMPOSITIONS

BACKGROUND OF THE INVENTION

1. Field of the Invention

This invention relates to polyvinyl alcohol compositions, and more particularly, to melt extrudable polyvinyl alcohol compositions containing a hydrocarbon oil or wax and either a polyethylene wax or an ethylene polymer and optionally, a plasticizer.

2. Description of the Prior Art

In extruding polyvinyl alcohol several problems have been generally encountered. The melting point of polyvinyl alcohol increases as the degree of hydrolysis increases.

The polyvinyl alcohol also has a tendency to stick, thereby interfering with smooth extrusion. In order to maintain sufficient fluidity the temperature of extrusion has to be increased, which in turn results in discoloration of the extruded product. The extrudability of polyvinyl alcohol has hitherto been sought to be improved, e.g., by the addition of 5–13 weight percent polyhydric alcohol plasticizer (such as glycerine) and 0.2 weight percent stearic acid lubricant (see U.S. Pat. No. 3,607,812). While these additives, almost entirely as a result of the use of the plasticizer, render the polyvinyl alcohol somewhat more fluid, the improvement is of limited utility because of the fugitive nature of the plasticizer and the higher water sensitivity of the extruded product.

SUMMARY OF THE INVENTION

According to the present invention there is provided a melt extrudable composition consisting essentially of (a) polyvinyl alcohol having a degree of polymerization of from about 500 to about 2000 and a degree of hydrolysis of at least about 88 percent; (b) 0 to about 20 percent, based upon the weight of polyvinyl alcohol-plasticizer blend, of a plasticizer, selected from the group consisting of polyhydric alcohols of the formula $R(OH)_x$ where R is an alkyl group of $C_2-C_4$ and x is 2–4 and ether condensation products thereof having a molecular weight of up to about 1000 (e.g., glycerine, triglycerol, hexaglycerol, decaglycerol, ethylene glycol, triethylene glycol, propylene glycol, butylene glycol); aliphatic amides of the formula $R'(CONR^2R^3)_x$ where $R'=H$ or $C_1-C_6$ alkyl, $R^2=H$ or $C_1-C_3$ alkyl, $R^3=H$ or $C_1-C_3$ alkyl and $x=1-2$; (e.g., formamide, acetamide); ureas of the formula $R^4R^6NCONR^5R^7$, where $R^4$ and $R^6=C_1-C_3$ alkyl and $R^5$ and $R^7=H$ or $C_1-C_3$ alkyl [e.g., $(CH_3)_2$ $NCON(CH_3)_2$]); and hydroxylated aliphatic amines of the formula $(R^8)_3N$, where $R^8$ is a mono- or dihydroxy alkyl group containing 2–4 carbon atoms and where the number of hydroxyl groups is less than the number of carbon atoms (e.g., triethanolamine); (c) about 0.5 to about 5.0 percent, based upon the weight of polyvinyl alcohol-plasticizer blend, of a hydrocarbon oil or wax having a weight average molecular weight of from about 100 to about 4000, said oil and wax being selected from the group consisting of fatty acids, fatty acid salts, fatty amides, fatty esters, fatty ethers, fatty alcohols and saturated and unsaturated hydrocarbons, provided that for blends of sodium acetate free polyvinyl alcohol neutral waxes are selected; and (d) about 0.5 to about 5 percent, based upon the weight of polyvinyl alcohol-plasticizer blend, of an ethylene polymer selected from homopolymers of ethylene and copolymers of ethylene with an ethylenically unsaturated mononmer, said ethylene polymer having a weight average molecular weight of from about 4000 to about 50,000, provided that in any given blend the molecular weight of component (d) is at least three times higher than the molecular weight of component (c).

DETAILED DESCRIPTION OF THE INVENTION

It has surprisingly been found that incorporation of small amounts (for example, 0.5 to 1.0 percent) of an oil or wax (for example, stearic acid, glycerol monostearate, polyoxyethylene monostearate, polyoxyethylene glycerine ether, various acetamides, lower molecular weight polyethylene waxes), and an ethylene polymer (e.g., polyethylene, ethylene/CO copolymer) into polyvinyl alcohol (PVA) results in a significant (up to about 50-fold) improvement in its melt flow rate. The combination is synergistic since it is much more effective than the sum of the two effects taken independently. The combination appears to be most effective in the presence of a plasticizer (e.g., glycerine, polyglycerol, acetamide) but the presence of a plasticizer is not essential.

The significantly increased melt flow rate results in considerably shorter residence times in the extruder thereby eliminating the problems of discoloration, sticking, and increase in melt viscosity. Improvements caused by the extrusion aids in decreasing the residence time are indicated by melt flow (melt index) and shear viscosity measurements. The use of the above referred to extrusion aids permits the attainment of practical extrusion rates for PVA (e.g., a rate which is 60–100 percent of the rate obtainable on the same equipment with low density polyethylene) at temperatures (e.g., 205°–240° C.) well below the thermal decomposition range (250°–300° C.) of polyvinyl alcohol.

Polyvinyl alcohol, the melt flow rate of which can be most advantageously improved according to the present invention is of the medium to high molecular weight grade having a degree of polymerization (D.P.) from about 500 to about 2000. Preferably, the D.P. is from about 800 to about 1500. On the other hand, the residual acetate level in the polyvinyl alcohol has little or no effect on its response to the extrusion aids. The hydrolysis degree of the polyvinyl alcohol thus is not critical. Generally, polyvinyl alcohol with hydrolysis degree of at least 88 percent will be employed. Both "plant grade" polyvinyl alcohol, i.e., one containing up to approximately 1.0 weight percent sodium acetate, as well as purified polyvinyl alcohol, which contains no sodium acetate, shows a remarkable improvement in its melt flow rate as a result of the specified combination of extrusion aids according to the present invention. However, acidic waxes, such as stearic acid, will rapidly cure the purified grades of polyvinyl alcohol. Thus, for sodium acetate free PVA the use of neutral oils or waxes is required.

For the purpose of the present invention polyvinyl alcohol is meant to include the homopolymer (i.e., the essentially completely hydrolyzed product) as well as a partially hydrolyzed product which can be considered a vinyl alcohol/vinyl acetate copolymer. The term polyvinyl alcohol as used herein further includes completely or partially hydrolyzed copolymers of PVA containing up to about 6 percent by weight of moieties derived from methyl methacrylate comonomer.

A wide variety of hydrocarbon oils or waxes are suitable as extrusion aids according to the present invention. Preferred oils or waxes are stearic acid, "hard" fatty amides ("Slipquick"), glyceryl monostearate, glyceryl trioleate, poly(ethylene oxide)$_{14}$ stearate, oxidized polyethylene, MW : 2500, pyrolyzed polyethylene, MW : 500–1000. For the reasons discussed above, neutral oils and waxes have more general utility. Materials found to be operable fall in a molecular weight range of about 100–4000, with a preferred range of 500–2500.

Ethylene polymers suitable as extrusion aids according to the present invention can be either homopolymers of ethylene (including polyethylene waxes), degraded homopolymers of ethylene, or copolymers of ethylene with an ethylenically unsaturated monomer, as well as degraded copolymers of ethylene (e.g., E/CO copolymers). The suitable polymers have a weight average molecular weight range of from about 4000 to about 50,000. Suitable comonomers include but are not limited to olefins of 3 to 12 carbon atoms, vinyl esters of saturated carboxylic acids of 2 to 18 carbon atoms, acrylates wherein the alcohol moiety is derived from aliphatic alcohols of 1 to 6 carbon atoms, unsaturated carboxylic acids such as acrylic, methacrylic, maleic, fumaric, itaconic, crotonic acids, carbon monoxide, sulphur dioxide.

Homopolymers of ethylene, and ethylene rich (i.e., containing at least about 66 percent ethylene) ethylene/carbon monoxide copolymers having a molecular weight range of from about 4000 to about 10,000 are preferred.

Most preferred ethylene polymers are as follows: polyethylene having a molecular weight of about 10,000 (such as "Microthene" MN 701), a polyethylene having a molecular weight of about 7,000 (such as "Epolene" C10), polyethylene having a molecular weight of about 4000 (such as "Epolene" C15), a 66/34 E/CO polymer (m.i. about 45) and a 70/10/20 E/hydroxyethyl methacrylate/CO terpolymer (m.i. about 75).

The molecular weight of the ethylene polymer component in any given blend has to be at least three times higher than the molecular weight of the oil or wax component.

The presence of a plasticizer enhances the improvement in the melt flow rate resulting from the use of the wax and ethylene polymer additives of the present invention. Polyhydric alcohols, aliphatic amides, ureas, and hydroxylated aliphatic amines are suitable plasticizers in the blends of the present invention.

The compositions of the present invention can be prepared by blending the ingredients by any convenient method. To facilitate blending, it is advantageous to use the wax and polymer additives in finely powdered form.

Melt index was measured by the extrusion procedure of ASTM D-1238 at the temperature specified in Tables II and III. A 2160 gram weight was used along with a stainless steel discharge orifice having a diameter of 0.208 centimeter and a land length of 0.903 centimeter. The sample was allowed to come to equilibrium at the desired temperature by subjecting it to a 5-minute hold period in the melt index apparatus. The melt index values listed in Tables II and III represent total grams collected during a 10-minute flow period.

Apparent shear viscosity at 232° C. and at a shear rate of 1,000 sec.$^{-1}$ was determined in a constant-rate capillary rheometer generally following the procedure of ASTM D 1703-62 (Reapproved 1971), Standard Recommended Practice for Presentation of Capillary Flow Data on Thermoplastics. The rheometer operates by means of a piston having a diameter of 0.3750 inches, and a die having an inner radius of 0.0155 inches and a length at this radius of 0.4980 inches. The length to radius ratio is 32 and the channel is terminated in planes perpendicular to its axis. Immediately before extrusion each sample was held in the rheometer at 232° C. for 5 minutes under a piston load corresponding to about 500 pounds per square inch to insure that it had melted and reached extrusion temperature.

The compositions of the present invention are suitable for extrusion into a variety of forms including pellets, strands, and filaments. Furthermore, the compositions are readily extrudable into both supported and unsupported films and coextrudable into multiply films with other polymer components (e.g., PE/PVA/PE three ply film).

The present invention is further illustrated by the following examples wherein all parts and percentages are by weight, except where noted otherwise. EXAMPLES Blend Preparation The indicated amounts of dry polyvinyl alcohol of the specified grades, was added to glycerine and the resulting mixture was blended by grinding in a mortar. The blend was then "aged" to distribute the glycerine plasticizer uniformly throughout the mix. Aging can be accomplished either by storage for 24 to 48 hours at ambient temperature or by heating at 60°–70° C. for about 2 hours. Prior to testing for melt index or shear viscosity, the PVA-glycerine blend was placed in a mortar and 1 percent by weight, based upon the weight of the blend, of stearic acid and 1 percent by weight of "Microthene" MN 701 polyethylene powder were added. The resulting mixture was ground vigorously to produce a homogeneous blend.

Extrusion

A Werner-Pfleiderer twin screw extruder was used to demonstrate the improved extrudability of PVA blends containing extrusion aids of the present invention. The assembly had water cooling on the hopper, and was equipped with a single hole three-sixteenths inch die. The PVA blends were fed to the extruder in the form of free-flowing powders which had been premixed with the plasticizer and extrusion aids in the manner described above except instead of grinding in a mortar the ingredients were tumbled in a mixer. The extrudate was collected on a "Teflon"-coated conveyor belt and was air cooled prior to cutting into three-eighths inch sections. The results are summarized in Table I. Similar results, demonstrating enhanced extrudability, were also obtained by using a Moi 2 inch twin screw extruder and a Hartig 2 inch single screw extruder.

Extrusion of PVA blends into thin films has also been demonstrated. The blend was prepared with purified PVA (Type C, Table I–IV footnote 5) and contained 3% "Microthene" MN 701 and 3% "Hoechst Wax" XL-223, an oxidized polyethylene wax having carboxyl end groups and a molecular weight of about 2500 supplied by American Hoechst. In this experiment a Werner-Pfleiderer twin screw machine equipped with a coat hanger film die was used. Operating at an extrusion temperature of 240°–250° C., pelletized blend prepared as described above (except for the omission of glycerine) could be gravity-fed to the extruder at normal rates to produce a gel-free, grainless film. The latter was collected on a heat-roll assembly to permit drawing controllable crosslinking in the extruder, quickly fouling the extruder barrel and take-off assembly.

TABLE I

| | Blend Makeup | | | | | |
|---|---|---|---|---|---|---|
| | | | "Extrusion Aids" | | Observed | |
| | PVA[3,5A] | Glycerine | "Microthene"[1A] MN 701 | Stearic Acid | Extrusion Rate | Appearance of |
| Example | % | (%) | (%) | (%) | (lb./hr.) | Extrudate |
| 1 | 85 | 15 | — | — | 0.7 – 1.4 (erratic) | Discolored, gassy |
| 2 | 82.5 | 15 | 0.5 | 2 | 9.0 | Slightly hazy, no discoloration, not gassy |
| 3 | 83 | 15 | 1.0 | 1.0 | 4.2 | & " |
| 4 | 83.5 | 15 | 0.5 | 1.0 | 5.8 | " |
| 5 | 84 | 15 | 0.5 | 0.5 | 8.0 | " | down to 1 ½–3 mil thickness and then spooled. Several attempts to extrude the same PVA without the extrusion aids being present were unsuccessful. In these latter experiments the PVA underwent rapid and uncontrollable Melt flow data obtained at 210° and 230° C., respectively, indicating the observed improvement in melt flow of the blends containing the extrusion aids of the present invention, are summarized in Tables II and III. The blends were prepared as described above.

TABLE II

Melt Flow Comparison Data Obtained at 210° C.

| Example | PVA Grade [3,5] | PVA/Glycerine Ratio | Additives[1] Wax (%) | Ethylene Polymer(%) | Melt Index (2160 g) | Ratio[2] |
|---|---|---|---|---|---|---|
| 6 | A | 85/15 | — | — | 0.27 | — |
| 7 | A | 80/20 | — | — | 0.44 | — |
| 8 | A | 90/10 | — | — | 0.11 | — |
| 9 | A | 85/15 | — | A(2.0) | 0.52 | 1.9 |
| 10 | A | 85/15 | B(2.0) | — | 0.64 | 2.4 |
| 11 | A | 85/15 | B(1.0) | — | 0.49 | 1.8 |
| 12 | A | 85/15 | B(2.0) | A(2.0) | 2.07 | 7.7 |
| 13 | A | 85/15 | B(2.0) | A(1.0) | 2.49 | 9.2 |
| 14 | A | 85/15 | B(1.0) | A(1.0) | 3.86 | 14.3 |
| 15 | A | 85/15 | B(2.0) | A(0.5) | 3.25 | 12.0 |
| 16 | A | 85/15 | B(1.0) | A(0.5) | 2.62 | 9.7 |
| 17 | A | 85/15 | B(0.5) | A(0.5) | 1.81 | 6.7 |
| 18 | A | 85/15 | B(10.0) | A(10.0) | 3.50 | 13.0 |
| 19 | A | 90/10 | B(1.0) | A(1.0) | 0.85 | 7.7 |
| 20 | A | 85/15 | B(2.0) | C(2.0) | 2.28 | 8.4 |
| 21 | A | 85/15 | B(2.0) | D(2.0) | 1.63 | 6.0 |
| 22 | A | 85/15 | B(1.0) | E(1.0) | 1.93 | 7.2 |
| 23 | A | 85/15 | B(1.0) | F(1.0) | 1.90 | 7.1 |
| 24 | A | 85/15 | G(1.0) | A(1.0) | 2.09 | 7.7 |
| 25 | A | 85/15 | H(1.0) | A(1.0) | 3.24 | 12.0 |
| 26 | A | 85/15 | I(1.0) | A(1.0) | 1.54 | 5.7 |
| 27 | A | 85/15 | J(1.0) | A(1.0) | 1.84 | 6.8 |
| 28 | A | 85/15 | K(1.0) | A(1.0) | 4.01 | 14.9 |
| 29 | A | 85/15 | L(1.0) | A(1.0) | 3.33 | 12.3 |
| 30 | A | 85/15 | M(1.0) | A(1.0) | 3.89 | 14.5 |
| 31 | C | 85/15 | — | — | 0.50 | — |
| 32 | C | 85/15 | B(1.0) | A(1.0) | 10.20 | 20.4 |
| 33 | C | 85/15 | I(1.0) | A(1.0) | 5.53 | 11.1 |
| 34 | C | 85/15 | J(1.0) | A(1.0) | 6.24 | 12.5 |
| 35 | C | 85/15 | K(1.0) | A(1.0) | 19.2 | 38.4 |
| 36 | C | 85/15 | L(1.0) | A(1.0) | 21.5 | 43.0 |
| 37 | B | 85/15 | — | — | 0.086 | — |
| 38 | B | 85/15 | B(1.0) | A(1.0) | 4.52 | 52.5 |
| 39 | D | 85/15 | — | — | 37.7 | — |
| 40 | D | 85/15 | B(1.0) | A(1.0) | 150.0 | 4.0 |
| 41 | F | 85/15 | — | — | 0.43 | — |
| 42 | F | 85/15 | B(1.0) | A(1.0) | 4.18 | 9.2 |
| 43 | E | 85/15 | — | — | 63.9 | — |
| 44 | E | 85/15 | B(1.0) | A(1.0) | 91.0 | 1.42 |

TABLE III

Melt Flow Comparison Data at 230° C.

| Example | PVA Grade[3,5] | PVA/Glycerine Ratio | Additives[1] Wax (%) | Ethylene Polymer (%) | Melt Index (2160 g) | Ratio[2] |
|---|---|---|---|---|---|---|
| 45 | C | 85/15 | — | — | 5.25 | — |
| 46 | C | 85/15 | B(1.0) | A(1.0) | 27.4 | 5.2 |
| 47 | C | 90/10 | — | — | 3.93 | — |
| 48 | C | 90/10 | B(1.0) | A(1.0) | 12.20 | 3.1 |
| 49 | C | 92.5/7.5 | — | — | 2.08 | — |
| 50 | C | 92.5/7.5 | B(1.0) | A(1.0) | 10.80 | 5.2 |

TABLE III-continued

Melt Flow Comparison Data at 230° C.

| Example | PVA Grade[3,5] | PVA/Glycerine Ratio | Additives[1] Wax (%) | Ethylene Polymer (%) | Melt Index (2160 g) | Ratio[2] |
|---|---|---|---|---|---|---|
| 51 | C | 95/5 | — | — | 1.48 | — |
| 52 | C | 95/5 | B(1.0) | A(1.0) | 8.52 | 5.8 |
| 53 | C | 97.5/2.5 | — | — | 1.62 | — |
| 54 | C | 97.5/2.5 | B(1.0) | A(1.0) | 5.60 | 3.5 |
| 55 | C | 100/0 | — | — | 1.01 | — |
| 56 | C | 100/0 | B(1.0) | A(1.0) | 2.24 | 2.2 |
| 57 | A | 90/10 | — | — | 0.24 | — |
| 58 | A | 90/10 | B(1.0) | A(1.0) | 0.98 | 4.1 |
| 59 | A | 100/0 | — | — | 0.035 | — |
| 60 | A | 100/0 | B(1.0) | A(1.0) | 0.113 | 3.2 |
| 61 | D | 100/0 | — | — | 14.2 | — |
| 62 | D | 100/0 | B(1.0) | A(1.0) | 53.3 | 3.7 |
| 63 | E | 100/0 | — | — | 18.6 | — |
| 64 | E | 100/0 | B(1.0) | A(1.0) | 21.0 | 1.1 |

The measurement of melt index does not appear to be a reliable test for the determination of the effect of the extrusion aids of the present invention on the flow characteristics of purified polyvinyl alcohol (i.e., PVA which had been exhaustively extracted with methanol to remove residual sodium acetate). The improved effect, however, is well demonstrated by the results of the shear viscosity measurements summarized in Table IV.

TABLE IV

Viscosity Comparison Data at 232° C.

| Example | PVA Grade[5] | PVA/Glycerine Ratio | Additives[1] Wax (%) | Ethylene Polymer (%) | Shear Viscosity in Poises at 1000 sec.$^{-1}$ Shear Rate | Observed Reduction in Shear Viscosity[7] |
|---|---|---|---|---|---|---|
| 65 | A[3] | 85/15 | — | — | 7.5 × 10³ | — |
| 66 | C[3] | 92.5/7.5 | — | — | 5.7 × 10³ | — |
| 67 | C[3] | 100/0 | — | — | 8.0 × 10³ | — |
| 68 | C[3] | 100/0 | B(1.0) | A(1.0) | 3.1 × 10³ | 2.6 |
| 69 | C[4] | 92.5/7.5 | — | — | 4.9 × 10³ | — |
| 70 | C[4] | 100/0 | — | — | 7.7 × 10³ | — |
| 71 | C[4] | 100/0 | B(1.0) | A(1.0) | No measurable flow | — |
| 72 | C[4] | 100/0 | K(1.0) | A(1.0) | 2.6 × 10³ | 3.0 |
| 73 | C[4] | 100/0 | N(1.0) | A(1.0) | 2.0 × 10³ | 3.9 |
| 74 | C[4] | 100/0 | O(1.0) | A(1.0) | 2.7 × 10³ | 2.9 |
| 75 | C[4] | 92.5/7.5 | K(1.0) | A(1.0) | 1.3 × 10³ | 3.8 |
| 76 | LDPE Control[6] | — | — | — | 1.76 × 10³ | — |

Footnotes for Tables I, II, III, and IV

1. Additives
 A - "Microthene" MN701 Polyethylene Powder, molecular weight about 10,000, available from U.S.I.
 B - Stearic Acid
 C - "Epolene" C-10 Polyethylene Powder, molecular weight about 7000, available from Eastman Kodak.
 D - "Epolene" C-15 Polyethylene Powder, molecular weight about 4000, available from Eastman Kodak.
 E - 66/34 Ethylene/Carbon Monoxide Copolymer, MI = 45.
 F - 70/10/20 Ethylene/Hydroxyethyl Methacrylate/CO Terpolymer, MI = 75.
 G - "Aldo" MLD Glyceryl Monolaurate, available from Glyco Chemicals, Inc.
 H - "Aldo" MR Glyceryl Monoricinoleate, available from Glyco Chemicals, Inc.
 I - Calcium Stearate
 J - Barium Stearate
 K - "Slipquick" Hard Fatty Amide, available from Fine Organic Chemicals, Inc.
 L - "Advawax" 240 Hard Fatty Amide, available from Cincinnati-Milacron.
 M - "Nopcowax" 22DS, supplied by Diamond Shamrock Chemical Co.
 N - "Pergosperse" S-9 Polyoxyethylene Monostearate, available from Glyco Chemicals, Inc.
 O - "Ethosperse" G-26 Polyoxyethylene Ether of Glycerine, available from Glyco Chemicals, Inc.
2. $\frac{\text{Melt Index Without Extrusion Aids}}{\text{Melt Index With Extrusion Aids}}$
3. Purified PVA Containing Approximately 1.0 Wt. % Sodium Acetate.
4. Purified PVA Extracted with Methanol to Reduce Sodium Acetate to a Maximum of 0.02 Wt. %.
5. PVA Description:

| Code | Type | Molecular Weight | DP | % Hydrolysis |
|---|---|---|---|---|
| A | 96/4 VOH/MMA Copolymer | Medium High | 1450 | 99 |
| B | Homopolymer | Medium High | 1450 | 99 |
| C | Homopolymer | Medium | 800 | 99 |
| D | Homopolymer | Low | 320 | 99 |
| E | VOH/VAC Copolymer | Low | 320 | 88 |
| F | VOH/VAC Copolymer | Medium | 800 | 88 |

6. Low Density Polyethylene Control, average molecular weight about 100,000.
7. $\frac{\text{Shear Viscosity Without Extrusion Aids}}{\text{Shear Viscosity With Extrusion Aids}}$

The invention claimed is:
1. A melt extrudable composition consisting essentially of (a) polyvinyl alcohol having a degree of polymerization from about 500 to about 2000 and a degree of hydrolysis of at least about 88%; (b) 0 to about 20% of plasticizer, based upon the weight of polyvinyl alcoholplasticizer blend, selected from the group consisting of polyhydric alcohols of the formula $R(OH)_x$ where R is an alkyl group of $C_2$–$C_4$ and $x$ is 2–4 and ether condensation products thereof having a molecular weight of up to about 1000; aliphatic amides of the formula $R'(CONR^2R^3)_x$ where $R'$=H or $C_1$–$C_6$ alkyl, $R^2$=H or $C_1$–$C_3$ alkyl, $R^3$=H or $C_1$–$C_3$ alkyl and $x$=1–2, ureas of the formula $R^4R^6NCONR^5R^7$, where $R^4$ and

$R^6=C_1-C_3$ alkyl and $R^5$ and $R^7=$H or $C_1-C_3$ alkyl, and hydroxylated aliphatic amines of the formula $(R^8)_3N$, where $R^8$ is a mono- or dihydroxy alkyl group containing 2–4 carbon atoms and where the number of hydroxyl group is less than the number of carbon atoms; (c) about 0.5% to 5.0%, based upon the weight of polyvinyl alcohol-plasticizer blend, of a wax having a weight average molecular weight of from about 100 to about 4000, said wax being selected from the group consisting of fatty acids, fatty acid salts, fatty amides, fatty esters, fatty ethers, fatty alcohols and saturated and unsaturated hydrocarbons, provided that for blends of sodium acetate free polyvinyl alcohol neutral waxes are selected; (d) about 0.5% to 5.0%, based upon the weight of polyvinyl alcohol-plasticizer blend, of an ethylene polymer selected from the group consisting of homopolymers of ethylene and copolymers of ethylene with an ethylenically unsaturated monomer, said ethylene polymer having a weight average molecular weight of from about 4000 to about 50,000; provided that in any given blend the molecular weight of component (d) is at least three times higher than the molecular weight of component (c).

2. The composition of claim 1 wherein said polyvinyl alcohol has a degree of polymerization of from about 800 to about 1500 and a degree of hydrolysis of at least about 99%.

3. The composition of claim 1 wherein said wax is selected from the group consisting of stearic acid, hard fatty amides, glyceryl monostearate, glyceryl trioleate, poly(ethylene oxide)$_{14}$ stearate, oxidized polyethylene having a molecular weight of about 2500, pyrolyzed polyethylene having a molecular weight of about 500–1000.

4. The composition of claim 1 wherein said ethylene polymer is selected from the group consisting of polyethylene and ethylene/carbon monoxide copolymer containing at least 66% by weight ethylene, the number average molecular weight of said ethylene polymer being from about 4000 to 10,000.

5. The composition of claim 4 wherein said wax is selected from the group consisting of stearic acid, hard fatty amides, glyceryl monostearate, glyceryl trioleate, poly(ethylene oxide)$_{14}$ stearate, oxidized polyethylene having a molecular weight of about 2500, pyrolyzed polyethylene having a molecular weight of about 500–1000.

6. The composition of claim 5 wherein said polyvinyl alcohol has a degree of polymerization of from about 800 to about 1500 and a degree of hydrolysis of at least about 99%.

7. The composition of claim 6 wherein said polyvinyl alcohol is a copolymer containing up to about 6% by weight of moieties derived from methyl methacrylate.

8. The compositon of claim 6 wherein said ethylene polymer is selected from the group consisting of polyethylene having a molecular weight of about 4000 to 10,000, 66/34 E/CO copolymer having a melt index of about 45 and 70/10/20 E/hydroxyethyl methacrylate/CO terpolymer having a melt index of about 75.

9. The composition of claim 5 wherein said plasticizer is selected from the group consisting of glycerine, triglycerol, formamide and triethanolamine, and wherein said wax and ethylene polymer are each present in an amount of from about 1.0 to about 3.0% by weight of PVA/plasticizer blend.

10. The composition of claim 9 wherein said plasticizer is present in an amount of about 5 to about 15% by weight of PVA-plasticizer blend.

* * * * *